UNITED STATES PATENT OFFICE.

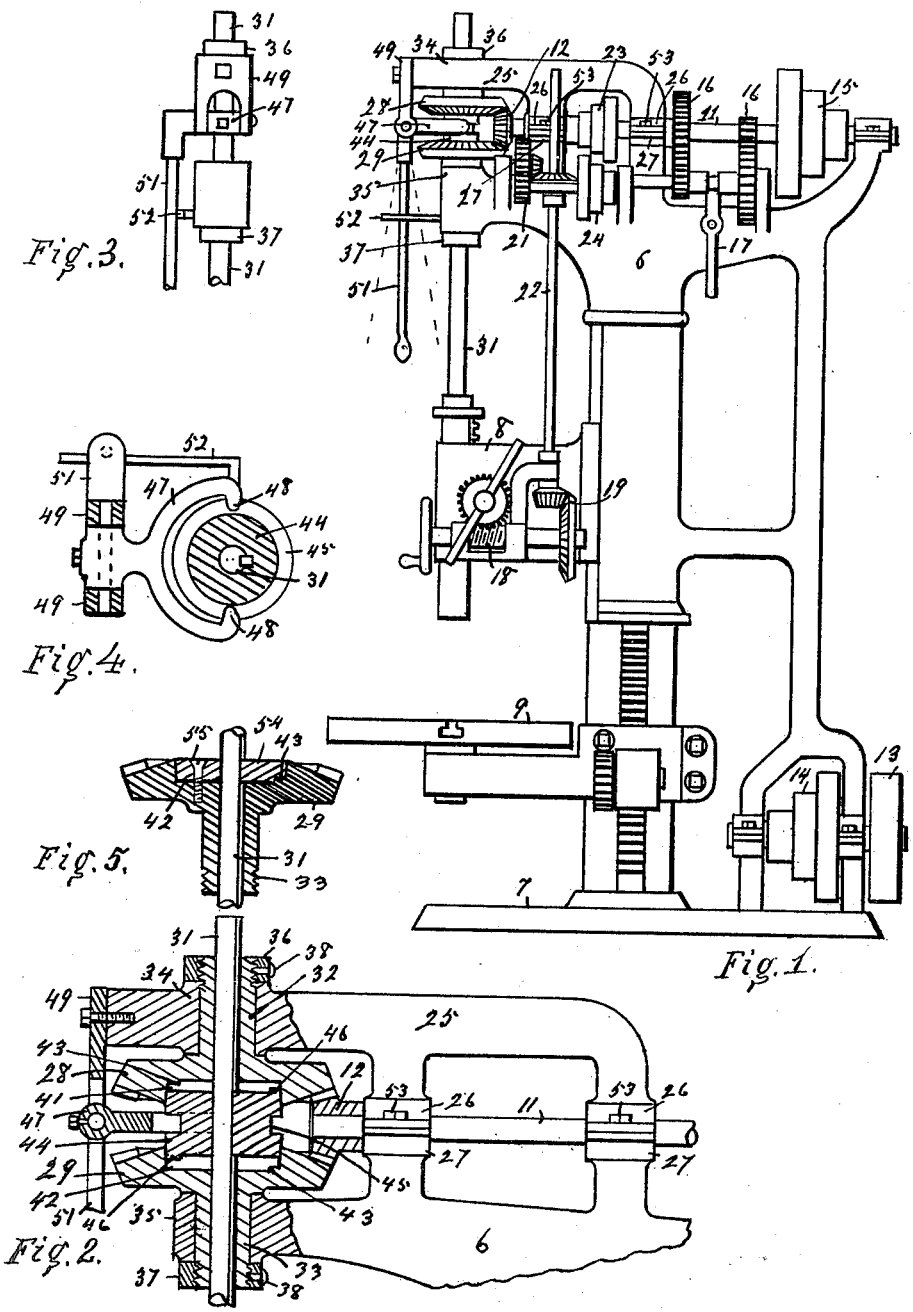

SHERMAN C. SCHAUER, OF CINCINNATI, OHIO, ASSIGNOR TO THE CINCINNATI MACHINE TOOL CO., OF SAME PLACE.

DRILL-PRESS.

SPECIFICATION forming part of Letters Patent No. 673,801, dated May 7, 1901.

Application filed December 17, 1900. Serial No. 40,188. (No model.)

*To all whom it may concern:*

Be it known that I, SHERMAN C. SCHAUER, a citizen of the United States, and a resident of Cincinnati, Ohio, have invented certain new and useful Improvements in Drill-Presses, of which the following is a specification.

My invention relates to drill-presses; and the objects of my improvement are to provide reversing mechanism for the spindle to be used for tapping or other purposes and which is self-contained and may be removably secured to the drill-press and to provide means to detachably spline the drive-gear to the spindle. These objects are attained in the following-described manner, as illustrated in the accompanying drawings, in which—

Figure 1 is a side elevation of a drill-press with my improvement attached thereto; Fig. 2, a side elevation, with parts in section, of the reversing mechanism; Fig. 3, a front elevation of the shifting-lever and its connections; Fig. 4, a plan, with parts in section, of the clutch and shifter; and Fig. 5, a section of the drive-gear and the spline-collar.

In the drawings, 6 represents the main frame, mounted on base 7 and provided with adjustable bracket 8 and adjustable table 9. Main shaft 11, provided with bevel-pinion 12, is driven from pulley 13 by a belt (not shown) on cone-pulleys 14 and 15. Back gears 16 are engaged by lever 17 to change the speed of the main shaft. Power feeding mechanism 18 is driven through gears 19 and 21 and shaft 22 by means of a belt (not shown) on cone feed-pulleys 23 and 24. To this extent of the description the several parts are constructed and assembled in the ordinary manner.

Bracket 25 is formed with caps 26 for boxes 27 on the frame, wherein the main shaft is journaled and whereby the bracket is removably secured to the frame. Reversing bevel-gear 28 and drive-gear 29, similar thereto, are bored for the passage therethrough of spindle 31 and formed with projecting hubs 32 and 33, whereby they are journaled in the respective bearings 34 and 35, formed in the bracket and in the frame. Said gears are in continuous engagement with pinion 12, whereby they are driven in opposite directions. Collars 36 and 37, each provided with a set-screw 38, are adjustably secured on the hubs of the gears outside of their respective bearings to maintain them properly therein and to take up the wear. Tapering counterbores 41 and 42 are formed in the face of the respective gears, and lugs 43 project from the bottom thereof. Friction-clutch 44, splined on the spindle between the said gears, is formed with annular groove 45 and with tapering ends to frictionally engage with the counterbores in the respective gears. Lugs 46 project from the ends of said clutch to engage the corresponding lugs 43 in the said gears for the purpose of arresting any slippage of the frictional engagement of the clutch with the counterbores. Shifting-yoke 47, formed with bosses 48 to engage with the annular groove in the clutch, is fulcrumed on plate 49, which depends from the front end of bracket 25. It is actuated by means of hand-lever 51, which is secured thereto to shift and maintain the clutch in frictional engagement with either of the gears 28 and 29, whereby the spindle may be driven in either of opposite directions. Spring-bar 52, secured to the main frame, projects into frictional contact with the side of said lever to maintain it in any position of adjustment.

By the removal of cap-screws 53 from journal-boxes 27 the bracket 25, together with reversing-gear 28, clutch 44, and the shifting mechanism, may all be removed together without disturbing their assemblage. After the bracket has been so removed from the frame ordinary caps should be secured on the journal-boxes 27, and collar 54 should be splined on the spindle and removably secured by means of set-screw 55 or otherwise to drive-gear 29 and within the counterbore 42 therein, whereby the spindle may be driven by the gear in the ordinary manner.

By the adoption of my improvement non-reversible may be converted into reversible spindle drill-presses to supply a wider demand at much less expense than need be incurred to carry both kinds of drill-presses in stock.

Having fully described my improvement, what I claim as my invention, and desire to secure by Letters Patent of the United States, is—

1. In a drill-press the combination with a bracket removably secured to the frame, and an upper bevel-gear carried thereby, of a bevel-gear formed with a socketed clutch-face with a lug projecting from the bottom of the socket, adapted to lock an auxiliary collar, a drive-pinion meshing with said bevel-gear, a drill-spindle movable through the hub of the bevel-gear, a clutch splined on said drill-spindle and engaging in the socket of the bevel-gear and formed with a lug to engage the lug in the socket of the gear to prevent slippage of frictional engagement of the parts, means for shifting the clutch into and out of engagement with the socket of the bevel-gear, and a removable collar adapted to engage in the socket of said gear when the upper gear and clutch are removed, substantially as shown and described.

2. In a drill-press the combination with the main frame, and a bracket detachably secured thereto and having a bearing for the hub of a gear, of a drive-gear on a shaft journaled in bearings in said bracket and frame, a bevel-gear having a counterbore and a hub fitted to a bearing in the frame, a spindle passed through said hub, and a removable collar splined on the spindle and fitted in the counterbore of the gear and adapted to be detachably secured thereto when the clutch is removed, all substantially as shown and described.

SHERMAN C. SCHAUER.

Witnesses:
AUG. H. TUECHTER,
R. S. CARR.